United States Patent
Zamir et al.

(10) Patent No.: US 11,005,886 B2
(45) Date of Patent: May 11, 2021

(54) MOVING TARGET DEFENSE WITH NETWORK LEVEL CHANGES PROVIDING SUBSTANTIALLY CONTINUOUS ACCESS TO APPLICATIONS

(71) Applicant: EMC IP Holding Company LLC, Hopkinton, MA (US)

(72) Inventors: Amos Zamir, Beer Sheva (IL); Oron Golan, Meitar (IL); Jehuda Shemer, Kfar Saba (IL); Kfir Wolfson, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 354 days.

(21) Appl. No.: 16/145,529

(22) Filed: Sep. 28, 2018

(65) Prior Publication Data
US 2020/0106807 A1    Apr. 2, 2020

(51) Int. Cl.
*H04L 29/06* (2006.01)
*G06F 9/54* (2006.01)
*H04L 12/755* (2013.01)

(52) U.S. Cl.
CPC .......... *H04L 63/1475* (2013.01); *G06F 9/542* (2013.01); *H04L 45/021* (2013.01); *H04L 63/1491* (2013.01)

(58) Field of Classification Search
CPC .............. H04L 63/1475; H04L 63/1491; H04L 45/021; G06F 9/542
See application file for complete search history.

(56) References Cited

U.S. PATENT DOCUMENTS 10,333,951 B1 * 6/2019 Natanzon ............ H04L 63/1408
10,681,057 B2 * 6/2020 Stehmeier ............... H04L 45/64
(Continued)

FOREIGN PATENT DOCUMENTS

EP    3276904 A1 *  1/2018 ......... H04L 63/1458

OTHER PUBLICATIONS

"NAT—Network Address Translation", NAT with Linux and iptables—Tutorial (Introduction), downloaded from https://www.karlrupp.net/en/computer/nat_tutorial on Sep. 13, 2018.
(Continued)

*Primary Examiner* — Hee K Song
(74) *Attorney, Agent, or Firm* — Ryan, Mason & Lewis, LLP

(57) ABSTRACT

Network level Moving Target Defense techniques are provided with substantially continuous access to protected applications. An exemplary method comprises identifying a first application listening to a first port or a first network address; notifying the first application to listen to a second port or a second network address; notifying at least one additional application that the first application is listening to the second port or the second network address; and notifying the first application to unlisten to the first port or the first network address, wherein the first application operates in a substantially continuous manner during a change from listening to one or more of the first port and the first network address and listening to one or more of the second port and the second network address. The first application can be a stateful application having persistent storage.

20 Claims, 13 Drawing Sheets

╭─ 800

---

Define for each application *i* in an infrastructure management tool at regular intervals of Δ*t* (or a pseudo random interval) task:

1. Change each application *i* to listen to a new port *y*. ($x\_(i, t) \rightarrow y\_(i, t+ \Delta t)$ where $x \neq y$).

2. Change each application *j* ≠ *i* to reach application *i* via port *y* by updating the configuration of the application or another valid way which update the application to open new connection via port *y*.

3. After finishing configuration of all other applications with the new ports (in step 2), application *i* is set to unlisten to port *x*.

(56) References Cited

U.S. PATENT DOCUMENTS

2016/0065612 A1\* 3/2016 Evans ................... G06F 9/441
                                                                726/22
2019/0052675 A1\* 2/2019 Krebs ................ H04L 63/1416

OTHER PUBLICATIONS

U.S. Appl. No. 15/797,597 entitled "Container Life Cycle Management with Honeypot Service" filed Oct. 30, 2017.
U.S. Appl. No. 15/797,609 entitled "Container Life Cycle Management with Session Dilution Time" filed Oct. 30, 2017.
U.S. Appl. No. 15/797,601 entitled "Container Life Cycle Management with Retention Rate Adjustment Based on Detected Anomalies" filed Oct. 30, 2017.

\* cited by examiner

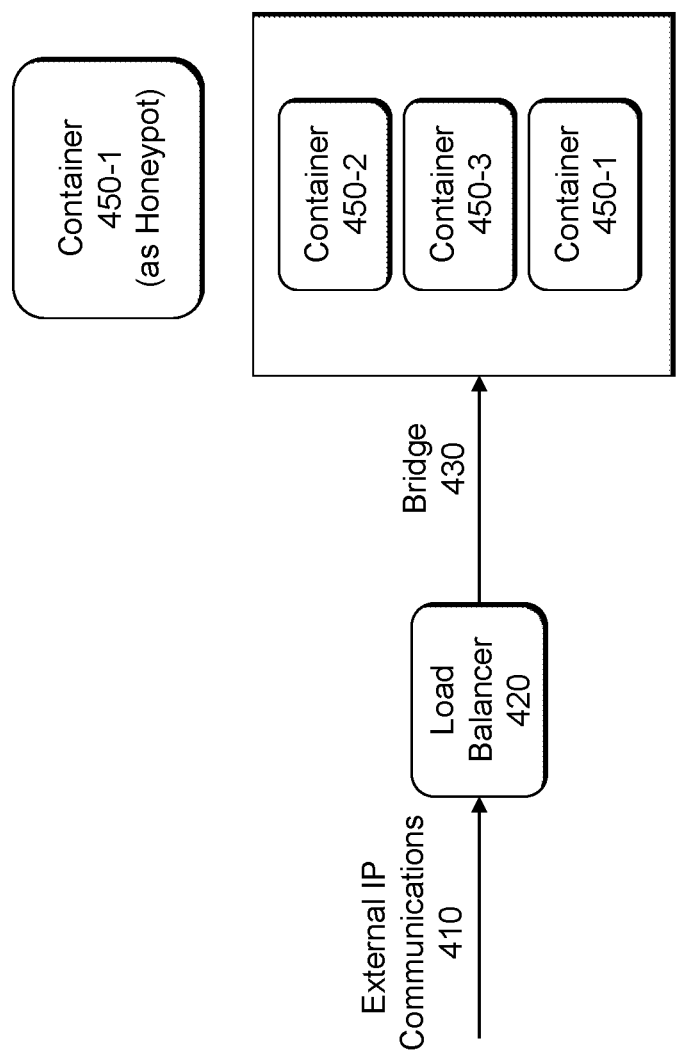

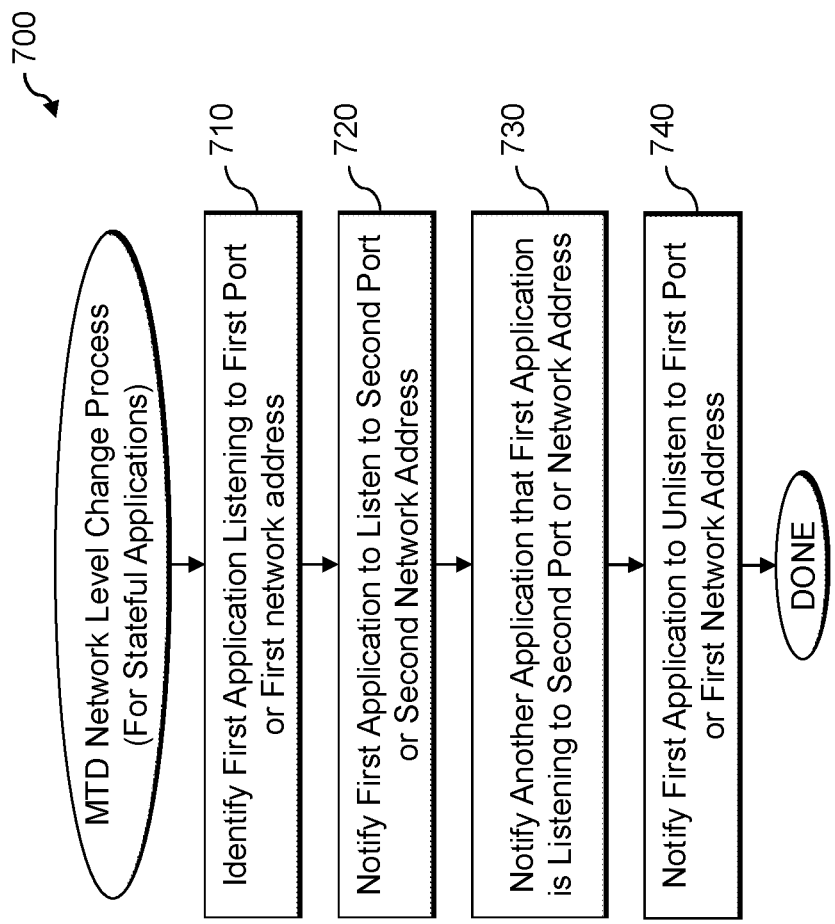

Define for each application $i$ in an infrastructure management tool at regular intervals of $\Delta t$ (or a pseudo random interval) task:

1. Change each application $i$ to listen to a new port $y$. ($x\_(i, t) \rightarrow y\_(i, t+ \Delta t)$) where $x \neq y$).
2. Change each application $j \neq i$ to reach application $i$ via port $y$ by updating the configuration of the application or another valid way which update the application to open new connection via port $y$.
3. After finishing configuration of all other applications with the new ports (in step 2), application $i$ is set to unlisten to port $x$.

FIG. 8

MOVING TARGET DEFENSE WITH NETWORK LEVEL CHANGES PROVIDING SUBSTANTIALLY CONTINUOUS ACCESS TO APPLICATIONS

CROSS-REFERENCE TO RELATED APPLICATION(S)

The present application is related to U.S. patent application Ser. No. 15/664,719 (now U.S. Pat. No. 10,333,951), entitled "Method and System for Implementing Golden Container Storage," U.S. patent application Ser. No. 15/797,597 (now U.S. Pat. No. 10,791,144), entitled "Container Life Cycle Management With Honeypot Service;" U.S. patent application Ser. No. 15/797,609, entitled "Container Life Cycle Management With Session Dilution Time;" and U.S. patent application Ser. No. 15/797,601 (now U.S. Pat. No. 10,951,651), entitled "Container Life Cycle Management With Retention Rate Adjustment Based On Detected Anomalies," each incorporated by reference herein in its entirety.

FIELD

The field relates generally to information security techniques for applications.

BACKGROUND

The static nature of many existing computing systems strengthens the susceptibility of the computing systems to malicious attacks and/or unauthorized access. The United States Department of Homeland Security defines Moving Target Defense (MTD) as "the concept of controlling change across multiple system dimensions in order to increase uncertainty and apparent complexity for attackers, reduce their window of opportunity and increase the costs of their probing and attack efforts."

A need remains for MTD techniques that provide substantially continuous access to protected applications.

SUMMARY

In one embodiment, an exemplary method comprises identifying a first application listening to one or more of a first port and a first network address; notifying the first application to listen to one or more of a second port and a second network address; notifying at least one additional application that the first application is listening to one or more of the second port and the second network address; and notifying the first application to unlisten to one or more of the first port and the first network address, wherein the first application operates in a substantially continuous manner during a change from listening to one or more of the first port and the first network address and listening to one or more of the second port and the second network address.

In some embodiments, the first application is a stateful application having persistent storage.

Other illustrative embodiments include, without limitation, apparatus, systems, methods and computer program products comprising processor-readable storage media.

BRIEF DESCRIPTION OF THE DRAWINGS

FIGS. 5 and 6 illustrate various stages in the life cycle of a container according to an embodiment of the disclosure;

FIG. 7 is a flow chart illustrating an exemplary implementation of an MTD network level change process for stateful applications, according to one embodiment of the disclosure;

FIG. 8 illustrates exemplary pseudo code for the exemplary MTD network level change process of FIG. 7, according to an embodiment;

DETAILED DESCRIPTION

Figure 1:
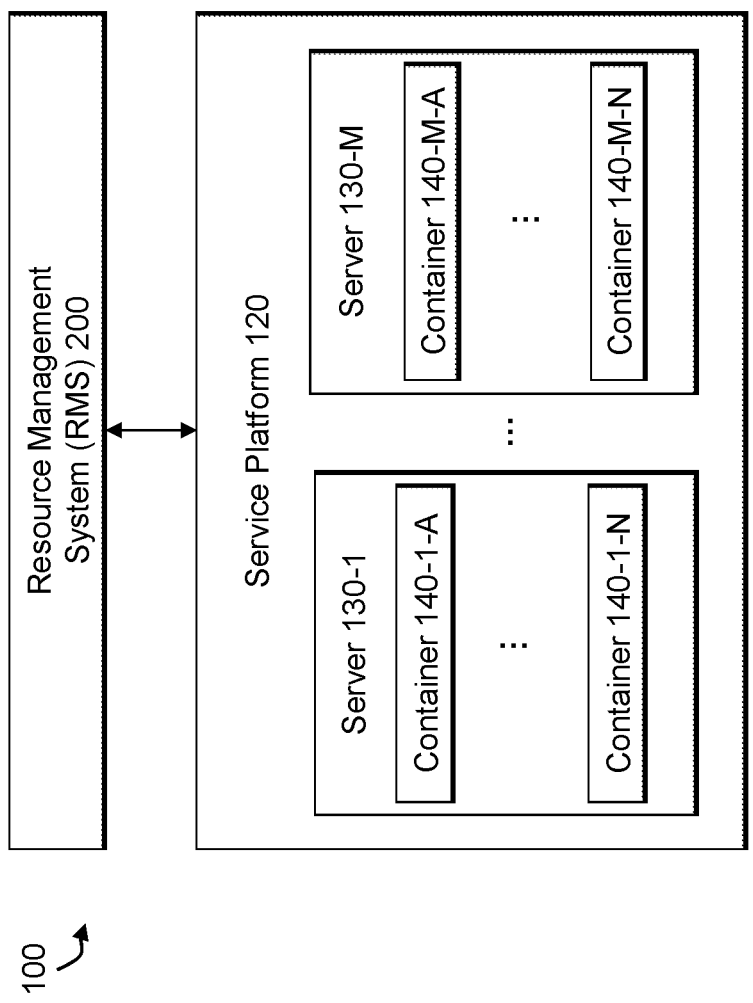
FIG. 1 illustrates an exemplary system, according to one or more embodiments of the disclosure.

Illustrative embodiments of the present disclosure will be described herein with reference to exemplary communication, storage and processing devices. It is to be appreciated, however, that the disclosure is not restricted to use with the particular illustrative configurations shown. Aspects of the disclosure provide methods, apparatus and computer program products for providing substantially continuous access to protected applications in an MTD environment.

In one or more embodiments, methods, systems and computer program products are provided for implementing MTD computer security techniques using network level changes for stateful applications. Specifically, one or more embodiments of the disclosure entail the creation of a container registry to securely store golden containers (or templates) for containers of specific application types that execute within a service platform. The containers are cycled out based on predefined retention rules, policies and time thresholds. Each recreated container is modeled after one of the golden containers, and assigned new Internet Protocol (IP) and/or media access control (MAC) addresses rather than assuming the existing addresses of the containers that the recreated containers are replacing. Substantively, embodiments of the disclosure employ these tactics towards implementing an MTD strategy.

One or more aspects of the present invention are directed to protection of "pet" and "cattle" servers. Generally, "pet" servers (or server pairs) are servers that are treated as indispensable or unique systems that must (substantially) always be operational. Typically, pet servers (also referred to herein as stateful servers) are manually built, managed, and "hand fed". Examples of pet servers comprise mainframe computers, solitary servers, high availability (HA) load balancers/firewalls (active/active or active/passive), and database systems designed as master/slave (active/passive) devices.

Stateful applications are services that typically require backing storage, and maintaining state of the applications is critical to running the service. Databases such as Cassandra, MongoDB, Postgres, and mySQL are examples of stateful applications. Stateful applications require some form of persistent storage that will not survive service restarts. Thus, a clean shutdown of a stateful application is typically required according to a predefined process before the stateful applications (e.g., pet devices) can be shutdown.

Cattle servers are typically arrays of more than two servers that are built using automated tools, and are designed for failure, where (typically) no one, two, or even three servers are irreplaceable. Typically, during failure events for cattle servers, no human intervention is required as the array exhibits attributes of "routing around failures," by restarting failed servers or replicating data through strategies, such as triple replication or erasure coding. Examples of Cattle servers comprise web server arrays, multi-master datastores (e.g., Cassandra clusters), multiple racks of gear put together in clusters, and other devices that are load-balanced and multi-mastered, such as many "Platform 3" containerized applications.

It has been said that cattle servers are disposable (like cattle in a herd), while pet servers are unique (and should be treated like actual pets). For example, a mail server should not go down. If a cattle server goes down, it can be replaced by another cattle server.

One or more aspects of the disclosure recognize that pet servers are often critical for an enterprise organization and pet servers can often be easily mapped by an attacker because their address or ports are static and do not change often. In one or more embodiments, the disclosed MTD strategies are implemented by changing a network resource map without interfering with organizational processes or shutting down any services, as discussed further below. Thus, MTD strategies are provided that change port assignments of an application without downtime. The exemplary MTD strategies change, in a controlled way, the port that a given application uses, and then other servers that access that port are notified accordingly.

In various implementations, MTD strategies can be implemented in different levels. For example, on a system level, a compiler can be used to generate multiple functionally equivalent, but internally different variants of a program. On an application level, an execution environment, for example, can check and verify the random key. Finally, on a network level, a Dynamic Resource Mapping System, for example, can randomly change the location of important resources of the system. In one or more embodiments, the present disclosure is implemented on a network level (using a representative Dynamic Resource Mapping System).

FIG. 1 illustrates an exemplary system 100, according to one or more embodiments of the disclosure. The system 100 includes a resource management system (RMS) 200, as discussed further below in conjunction with FIG. 2, operatively connected to a service platform 120. In one embodiment of the disclosure, the RMS 200 and the service platform 120 may be directly or indirectly connected to one another through a network (e.g., a local area network (LAN), a wide area network (WAN) such as the Internet, a mobile network, or any other type of network). In embodiments where the RMS 200 and the service platform 120 are indirectly connected, there may be other networking components or systems (e.g., switches, routers, gateways, etc.) (not shown) that facilitate communication and/or information exchange. Further, the RMS 200 and the service platform 120 may communicate with one another using any combination of wired and/or wireless communication connections and/or protocols.

In at least one embodiment of the disclosure, the RMS 200 may be a platform for the centralized management and deployment of containers in the service platform 120. The RMS 200 may be implemented on a physical server (e.g., in a data center) or on a virtual server that may be cloud-based. Further, the RMS 200 may be implemented on a single server, or alternatively, on multiple servers that may be physical, virtual, or a combination thereof. In one embodiment of the disclosure, the RMS 200 may be implemented on one or more computing systems similar to the exemplary computing systems shown in FIGS. 12 and 13.

In one embodiment of the disclosure, the service platform 120 may be a hardware and/or software implemented environment for the deployment of services and resources. The service platform 120 may be implemented on one or more servers 130-1 through 130-M. Each server 130 may be a physical server or a virtual server that may be cloud-based. In one embodiment of the disclosure, each server 130 may be a computing system similar to the exemplary computing system discussed further below in conjunction with FIG. 13. Further, each server 130 may be any computing system that may be programmed to receive requests, process requests, and based on the processing of requests, extend services and/or resources to client computing systems (not shown). Examples of types of servers include, but are not limited to, virtualized servers, database servers, application servers, print servers, and mail servers.

In one embodiment of the disclosure, each server 130 may be further programmed to provide computing resources to support the implementation and functionalities of a set of containers 140-1-A through 140-M-N. A container 140 may be an isolated, lightweight virtualization mechanism (or software construct) that allows for the running of an application or an operating system within the container 140 without the overhead of executing a hypervisor (as is needed for executing virtual machines on underlying hardware). Minimal overhead may be generated by containers 140 because: (i) containers 140 share the same operating system kernel with other containers 140 and the underlying host (e.g., a server 130); and (ii) containers 140 (unlike virtual machines) do not need to emulate physical hardware. Further, in one embodiment of the disclosure, a container 140 may be implemented virtually by a host operating system.

In one embodiment of the disclosure, the set of containers 140-1-A through 140-M-N may be segmented into one or more pods (not shown). Specifically, each pod may include a subset (ss) of the set of containers 140-1-A through 140-M-N. In one embodiment of the disclosure, the aforementioned subset of containers 140-$ss$ may be co-located in the same server (e.g., 130-1). In another embodiment of the disclosure, the aforementioned subset of containers 140-$ss$ may be executing on multiple servers 130-1 through 130-M of the service platform 120. Furthermore, the subset of containers 140-$ss$ in each pod may work together towards implementing a service. Subsequently, each container 140 in a pod may be assigned an application type, and thus, include functionalities conforming to their assigned application type. The application type that may be assigned to a container 140 may include, but is not limited to, a front-end application type, a back-end application type, and a database application type.

In one embodiment of the disclosure, a front-end (fe) application type container 140-$fe$ may be representative of server computing resources dedicated towards facilitating the interaction between a service and a user, or a service and another service. Specifically, a front-end application type container 140-$fe$ may include functionality to: (i) provide a specification for how the interaction and/or exchange of information should take place between the service and a user or other service; (ii) receive input (i.e., data, requests, etc.), conforming to the aforementioned specification, from a user or other service; and (iii) provide output (i.e., processed data, responses, resources, etc.), conforming to the aforementioned specification, to a user or other service. By way of example, a front-end application type container 140-*fe* may implement at least a portion of a command line interface (CLI), a graphical user interface (GUI), an application program interface (API), a web-based user interface (WUI), a natural language interface, or any combination thereof.

In one embodiment of the disclosure, a back-end (be) application type container 140-*be* may be representative of server computing resources dedicated towards implementing the functional logic and operations supporting a service, as discussed further below in conjunction with FIGS. 9 through 11. Specifically, a back-end application type container 140-*be* may include functionality to: (i) validate received input from a user or other service; (ii) maintain service-wide security operations; (iii) communicate with external hosts to retrieve additional information; and (iv) process (i.e., execute algorithms on) the received input and additional information, if any, to generate output. By way of example, a back-end application type container 140-*be* may implement at least a portion of a data processing algorithm, a validation rule, an internet security suite, a web-service (i.e., technology that allows services/applications to communicate with each other), etc.

In one embodiment of the disclosure, a database (db) application type container 140-*db* may be representative of server computer resources dedicated towards the management of information, as discussed further below in conjunction with FIGS. 9 through 11. Specifically, a database application type container 140-*db* may include functionality to: (i) track and administer information generated, stored, and/or used by the service; (ii) maintain a schema (i.e. logical structure) for the information; (iii) monitor information storage and retrieval performance; and (iv) encode information through the application of, for example, encryption, compression, deduplication, and other data transforming operations. By way of example, a database application type container 140-*db* may implement at least a portion of database management system (DBMS), an encryption, compression, deduplication, etc., algorithm, a query-response system (QRS), etc.

While containers throughout the disclosure may host applications, and thus, may be associated with application types, as described above, one of ordinary skill in the art will appreciate that containers can host other constructs without departing from the scope of the disclosure. For example, in one embodiment of the disclosure, a container 140 may alternatively host a micro-service, which may structure an application as a collection of coupled services. In another embodiment of the disclosure, a container 140 may alternatively host a web server, and thereby include functionality to store, process, and/or deliver web resources to one or more clients (not shown). In yet another embodiment of the disclosure, a container 140 may alternatively host a monitoring tool for the surveilling of, for example, web resources, servers, networks, and/or application performance and reliability.

Further, while one or more embodiments are illustrated herein in the context of containerized applications, aspects of the present invention may also be applied to virtualized applications executed using one or more virtual machines, as would be apparent to a person of ordinary skill in the art.

Figure 2:
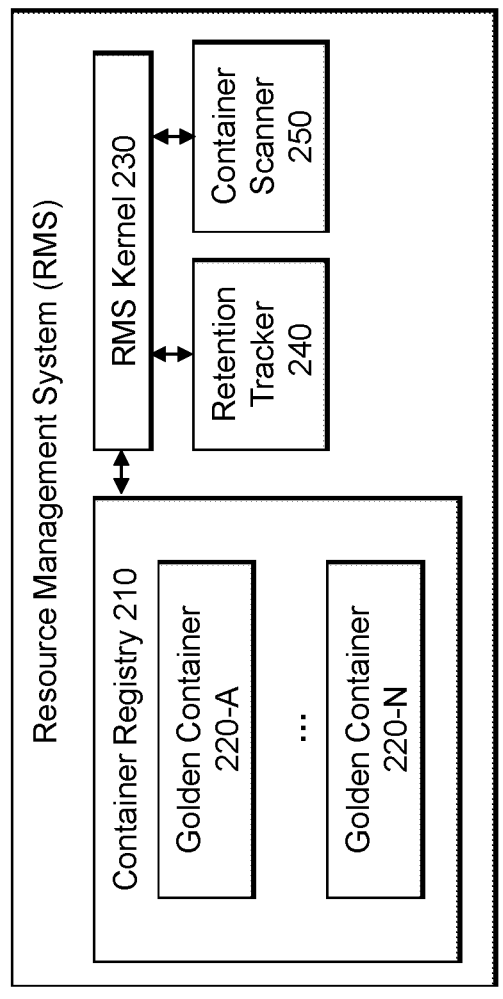
FIG. 2 illustrates the resource management system of FIG. 1, in further detail, according to an embodiment of the disclosure.

FIG. 2 illustrates the resource management system 200 of FIG. 1, in further detail, according to an embodiment of the disclosure. The RMS 200 includes an RMS kernel 230 operatively connected to a container registry 210, a retention tracker 240, and a container scanner 250. Each of these components is described below.

In one embodiment of the disclosure, the RMS kernel 230 may be a core application or computer program (e.g., an operating system) executing on the underlying hardware (e.g., one or more integrated circuits) of the RMS 200. The RMS kernel 230 may include functionality to: (i) generate, store, and retrieve golden containers (described below); (ii) create containers based on a golden container of the same application type; (iii) delete or reassign containers as honeypots; (iv) generate and feed emulated network traffic to honeypot containers; (v) submit scan requests to, and receive scan responses from, the container scanner 250; and (vi) submit track requests to, and receive elapse notifications from, the retention tracker 240. One of ordinary skill in the art will appreciate that the RMS kernel 230 may include other functionalities without departing from the scope of the disclosure.

In one embodiment of the disclosure, the container registry 210 may be a secure repository for storing one or more golden containers 220-A through 220-N. The container registry 210 may be segmented into one or more logical partitions (not shown), whereby each logical partition may be reserved to store golden containers 220-A through 220-N for a particular service implemented on the service platform. The container registry 210 may be implemented using any type of storage unit and/or device (e.g., a file system, a database, a collection of tables, or any other storage mechanism). Further, the container registry 210 may be implemented using multiple storage units and/or devices, which may or may not be of the same type or located at the same physical site. In one embodiment of the disclosure, the container registry 210 may be implemented using persistent (i.e., non-volatile) storage media such as, for example, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other memory defined as a non-volatile Storage Class Memory (SCM).

In one embodiment of the disclosure, a golden container 220 may be a template for all containers of a specific application type that implement at least a portion of a service deployed through the service platform. Specifically, a golden container 220 may be a version (i.e., snapshot at a given time) of a cloned container belonging to a specific application type and used in the implementation of a service. Further, a golden container 220 may be used as a template for the generation of new containers of that specific application type towards implementing at least a portion of the service. As mentioned above, a container (and subsequently, a golden container 220) may be associated with a front-end application type, a back-end application type, or a database application type. In one embodiment of the disclosure, a golden container 220 may include all the libraries, tools, and software needed to support the functionalities and/or responsibilities of a container assigned to their specific application type and towards implementing at least their portion of a service. Further, in one embodiment of the disclosure, a golden container 220 may also be referred to as a golden image or a master image/container.

In one embodiment of the disclosure, the retention tracker 240 may be a computer process (or an instance of a computer program) executing on the RMS 200. Specifically, the retention tracker 240 may be a computer process dedicated towards the management of container retention times. A container retention time may refer to a duration of time (e.g., minutes, hours, etc.) specifying the lifespan of a container executing on the service platform. In one embodiment of the disclosure, the retention tracker 240 may include functionality to: (i) receive track requests from the RMS kernel 230; (ii) in response to receiving track requests, initialize and track the retention time for one or more containers actively executing on the service platform; and (iii) when a retention time for a container elapses, plus any predefined session dilution time, generate and transmit an elapse notification to the RMS kernel 230.

In one embodiment of the disclosure, the container scanner 250 may be a computer process (or an instance of a computer program) executing on the RMS 200. Specifically, the container scanner 250 may be a computer process dedicated towards the validation of containers. Validation of a container may refer to determining whether the container includes computer readable program code consistent with malicious activity, and/or whether the container exhibits anomalous behavior. Thus, in one embodiment of the disclosure, the container scanner 250 may include functionality to: (i) maintain and update a library of digital signatures (e.g., patterns of data) unique to one or more known cyber threats and/or attacks; (ii) generate models of the intended behavior (e.g., normal operation) of one or more containers executing on the service platform; (iii) receive scan requests from the RMS kernel 230 specifying container IDs; (iv) in response to receiving scan requests, subject containers to one or more misuse and/or anomaly detection algorithms; (v) based on a matching of at least one known digital signature to at least a portion of a container, determine that the container is contaminated; (vi) based on at least one deviation from a model exhibited by an active container, determine that the container is contaminated; (vii) based on not one match to a known digital signature to at least a portion of a container and based on observing no deviations in behavior exhibited by a container with respect to a model of the container, determine that the container is clean; and (viii) generate and provide scan responses, to the RMS kernel 230, including the results of the validation process (e.g., that a container is clean, or alternatively, that a container is contaminated).

For a further discussion of golden containers 200 and container registries 210, see, for example, U.S. patent application Ser. No. 15/664,719 (now U.S. Pat. No. 10,333,951), filed Jul. 31, 2017, entitled "Method and System for Implementing Golden Container Storage," incorporated by reference herein in its entirety.

It is noted that container registry 210 may be implemented, at least in part, using the Docker hub container registry, from Docker, Inc. In one or more embodiments, a Kubernetes Container Orchestration Engine (COE) (see, e.g., https://kubernetes.io/) may be employed to automate deployment, scaling, and management of the containerized applications.

Figure 3:
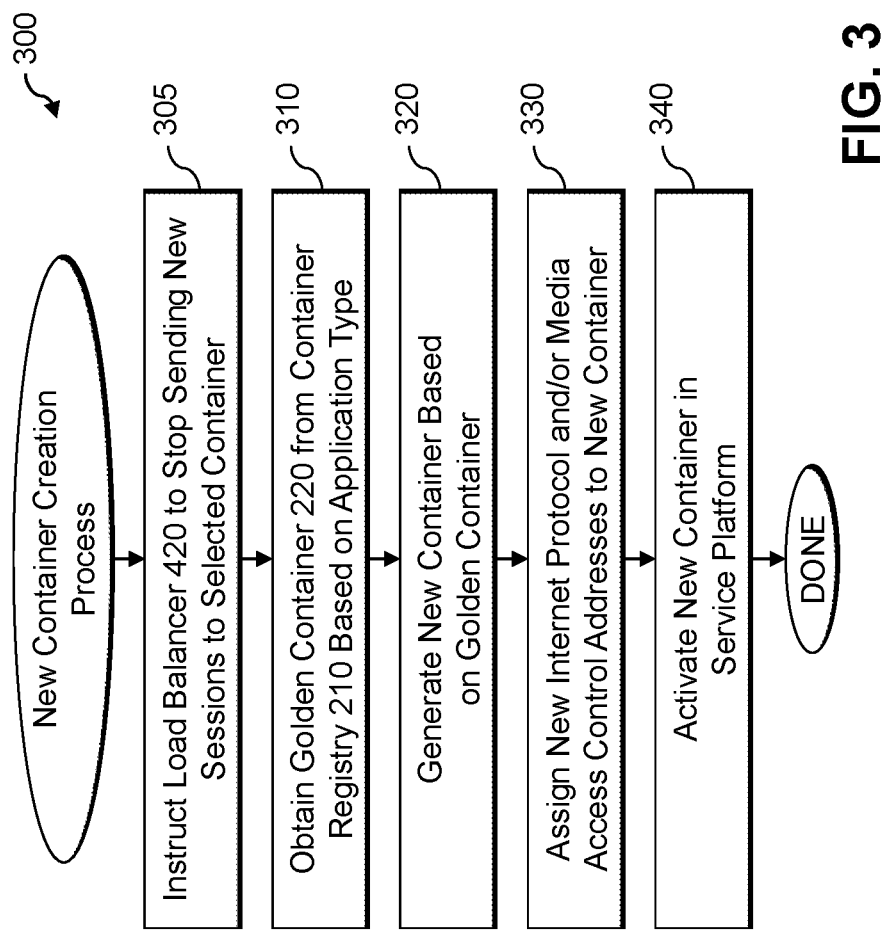
FIG. 3 is a flow chart illustrating an exemplary implementation of a new container creation process, according to one embodiment of the disclosure.

FIG. 3 is a flow chart illustrating an exemplary implementation of a new container creation process 300, according to one embodiment of the disclosure. As shown in FIG. 3, the exemplary new container creation process 300 initially instructs the load balancer 420 (FIG. 4) to stop sending new sessions to the selected container during step 305. In one or more embodiments, the retention tracker 240 issues an elapse notification during step 305 to the RMS kernel 230. The elapse notification may include, for example, a container identifier that uniquely identifies the container 140 associated with the elapsed retention time (e.g., the old container). Thereafter, in response to receiving the elapse notification, the RMS kernel 230 obtains a golden container 220 from the container registry 210 during step 310, e.g., based on the application type.

Thus, in an embodiment of the disclosure, the golden container 220 obtained from the container registry 210 may be of the same application type as the old container (e.g., selected container 140). More specifically, the obtained golden container 220 may be retrieved from a logical partition reserved for the specific service that the old container is or has been, at least in part, implementing.

During Step 320, the RMS kernel 230 generates a new container, based on the obtained golden container 220. In one embodiment of the disclosure, the RMS kernel 230 may generate the new container 140 based on the template outlined by the golden container 220 (obtained in step 310). The new container may be generated as a substitute for the old container, whose predefined retention time had elapsed through a determination performed in step 320, and accordingly, may be associated with the same application type as the old container and the golden container.

During step 330, the RMS kernel 230 assigns an Internet Protocol (IP) address to the new container (generated in step 320). In one embodiment of the disclosure, a new IP address is assigned rather than transferring the existing IP address associated with the old container to the new container. In one embodiment of the disclosure, a new IP address may be assigned to the new container as an MTD measure (described above). In another embodiment of the disclosure, the RMS kernel 230 may further assign a media access control (MAC) address to the new container. The MAC address may be a new MAC address rather than the existing MAC address associated with the old container. Similarly, the new MAC address may be assigned to the new container as another MTD measure.

The new container is then activated in the service platform 120 during step 340. For example, the RMS kernel 230 can connect the new container into the service platform 120. Specifically, in one embodiment of the disclosure, the new container may be directed to a pod on the service platform 120 that implements the service that the old container may be, at least in part, implementing. At this point, the new container replaces the old container, thereby assuming one or more functionalities of the service, which may have been implemented by the old container.

After connecting the new container during step 340, the RMS kernel 230 disconnects the old container from the service platform 120. Specifically, in one embodiment of the disclosure, the old container may be deleted, leading to the deallocation of server computing resources expended towards implementing the old container.

Figure 4:
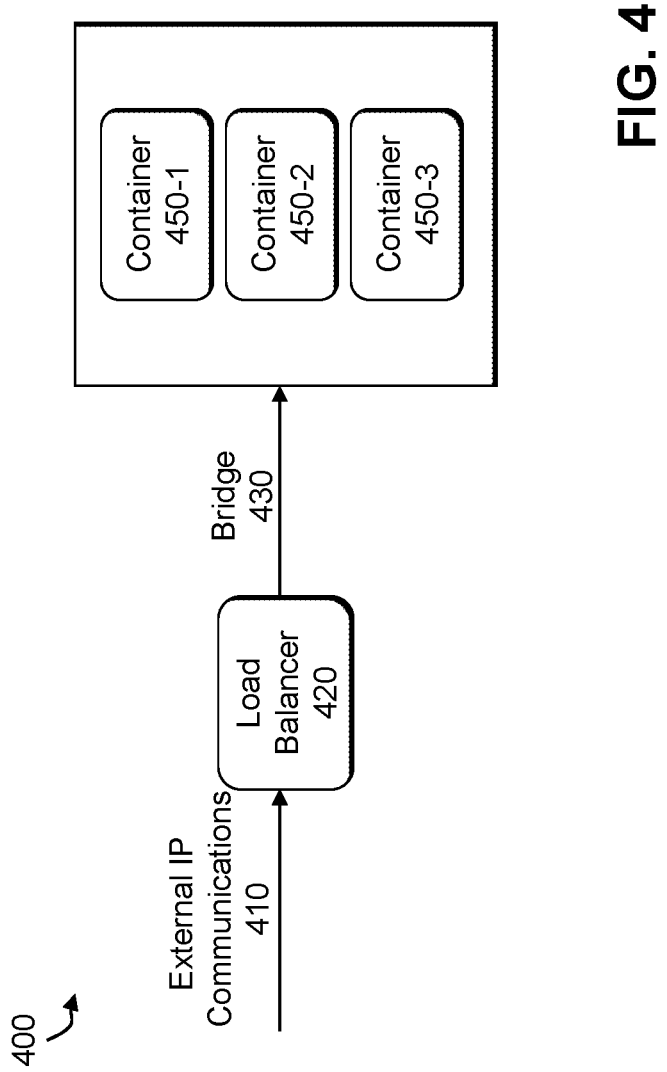
FIG. 4 illustrates an exemplary container environment, according to some embodiments of the disclosure.

FIG. 4 illustrates an exemplary container environment 400, according to some embodiments of the disclosure. In the exemplary embodiment of FIG. 4, a web service is deployed to three containers 450-1 through 450-3. The containers 450-1 through 450-3 each have a unique IP address, and provide a service to a load balancer 420. It is typically desirable to load balance between the containers 450-1 through 450-3, for example, using a proxy or a load balancer.

In the example of FIG. 4, load balancer 420 receives external IP communications 410 for the service and load balances the traffic for the service among containers 450-1 through 450-3, using a bridge 430. It noted that only front-end application type containers 140-*fe* are expected to have external IP communications 410.

In one or more embodiments, the load balancer 420 may be implemented, for example, as a Google load balancer or a Microsoft Azure load balancer.

Figure 5:
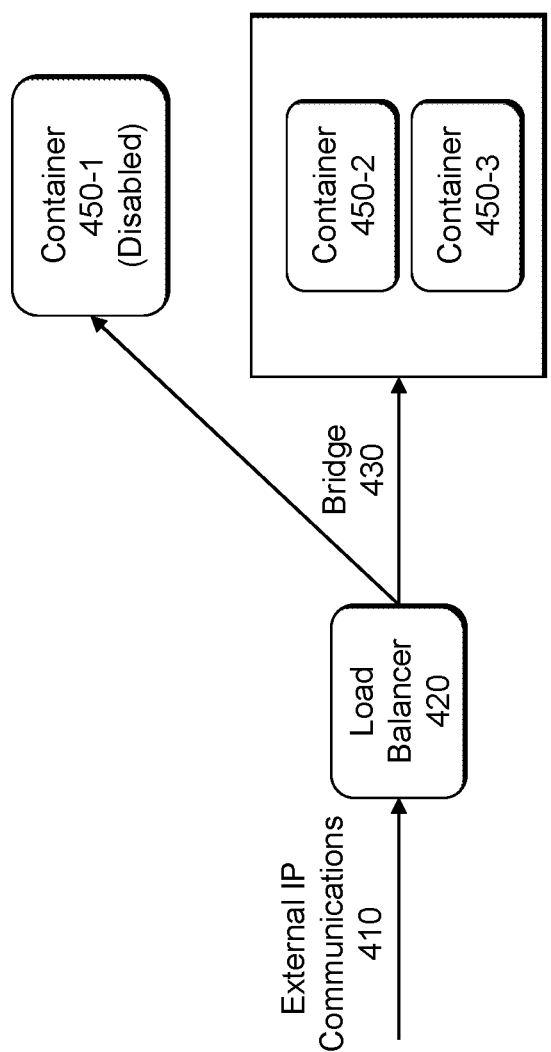

FIG. 5 illustrates container 450-1 of FIG. 4, during the predefined session dilution time of the container 450-1, according to an embodiment of the disclosure. As noted above, the session dilution time has been selected to allow existing sessions to finish before the container 450-1 is disconnected from the service platform 120. Thus, as shown in FIG. 5, the load balancer 420 sets the container 450-1 to a disabled status, such that the existing sessions will be processed, but the load balancer 420 will not send any new sessions to the disabled container 450-1.

Thus, when load balancer 420 receives new external IP communications 410 for the service the load balancer 420 will load balance the new session traffic for the service only among containers 450-2 and 450-3, using bridge 430, until a new container is activated to replace the disabled container 450-1.

FIG. 6 illustrates container 450-1 of FIG. 4, during the Honeypot role of the container 450-1, according to an embodiment of the disclosure. In one or more embodiments, once the load balancer 420 sets the container 450-1 to the disabled status, as discussed above in conjunction with FIG. 5, the load balancer 420 will not send any new sessions to the disabled container 450-1. Thus, no session traffic should be sent to the disabled container 450-1, and any traffic to the disabled container 450-1 (now in the role of a Honeypot) is considered malicious or anomalous traffic.

Thus, while the RMS kernel 230 is maintaining and monitoring the container 450-1 as a Honeypot, and the RMS kernel 230 detects traffic being sent to the disabled container 450-1, the RMS kernel 230 raises an alert because there should not be any communications to the container 450-1. Such malicious or anomalous traffic would be sent to the disabled container 450-1 (now a Honeypot) through a routing table, or a Web Application Firewall (WAF).

FIG. 7 is a flow chart illustrating an exemplary implementation of an MTD network level change process 700 for stateful applications, according to one embodiment of the disclosure. As shown in FIG. 7, the exemplary MTD network level change process 700 initially identifies a first application (e.g., a stateful application having persistent state storage), requiring network level changes, listening to a first port or a first network address during step 710. During step 720, the exemplary MTD network level change process 700 notifies the first application to listen to a second port or a second network address (for example, using an incoming rule in a routing table employed by the first application).

Thereafter, the exemplary MTD network level change process 700 notifies another application during step 730 that the first application is now listening to the second port or network address (for example, using an infrastructure management tool, discussed below). Finally, the first application is notified during step 740 to unlisten to the first port or first network address.

Among other benefits, the first application of the exemplary MTD network level change process 700 can operate in a substantially continuous manner during the change from listening to the first port (or first network address) and listening to the second port (or second network address).

In some embodiments, after the first application begins listening to the second port (or the second network address), communications for the first port (or the first network address) are optionally routed to a honeypot listener to generate alerts, for example, based on predefined policies and/or rules.

In one or more embodiments, the first application listens to an internal fixed port (or an internal fixed network address) and a routing table exposes the first port (or the first network address) and communications to the first port (or the first network address) are forwarded to the internal fixed port (or the internal fixed network address) until the first application is notified to listen to the second port (or the second network address).

Likewise, the first application can unlisten to the first port (or the first network address) by updating the routing table to expose the second port (or the second network address) and communications to the second port (or the second network address) are forwarded to the internal fixed port (or the internal fixed network address).

Infrastructure management tools, such as Puppet™, Chef™, Ansible™ and/or SaltStack™ infrastructure management tools, involve many operational components, such as data, processes, networks, operating platforms, equipment and devices. Configuration management encompasses the practices and tooling to automate the delivery and operation of infrastructure. Configuration management tools model infrastructure, monitor and enforce configurations, and remediate unexpected changes or configuration changes, in a known manner.

While Puppet is employed as a representative infrastructure management tool, other infrastructure management tools can be employed, as would be apparent to a person of ordinary skill in the art.

FIG. 8 illustrates exemplary pseudo code 800 for the exemplary MTD network level change process 700 of FIG. 7, according to one embodiment of the disclosure. Assume that x_(i, t) in FIG. 8 indicates a port x of an application i at a time t.

Define for each application i in an infrastructure management tool at regular intervals of $\Delta t$ (or a pseudo random interval) task:

1. Change each application i to listen to a new port y. (x_(i, t)→y_(i, t+$\Delta t$) where x≠y). In Linux OS, for example, the change can be implemented by inserting a new rule to a prerouting chain of the network address translation table (NAT) table of the IP table.
2. Change each application j≠i to reach application i via port y by updating the configuration of the application or another valid way which update the application to open new connection via port y.
3. After finishing configuration of all other applications with the new ports (in step 2), application i is set to unlisten to port x.

An additional and optional step is to route port x to a honeypot listener and to generate alerts when new packets arrive.

It is noted that a stateful application does not have to be restarted following any of the steps in the exemplary pseudo code 800 of FIG. 8. In some embodiments, other applications that depend on the stateful application may be restarted to be loaded with the new configuration to communicate with the stateful application at the new port or address.

Figure 9:
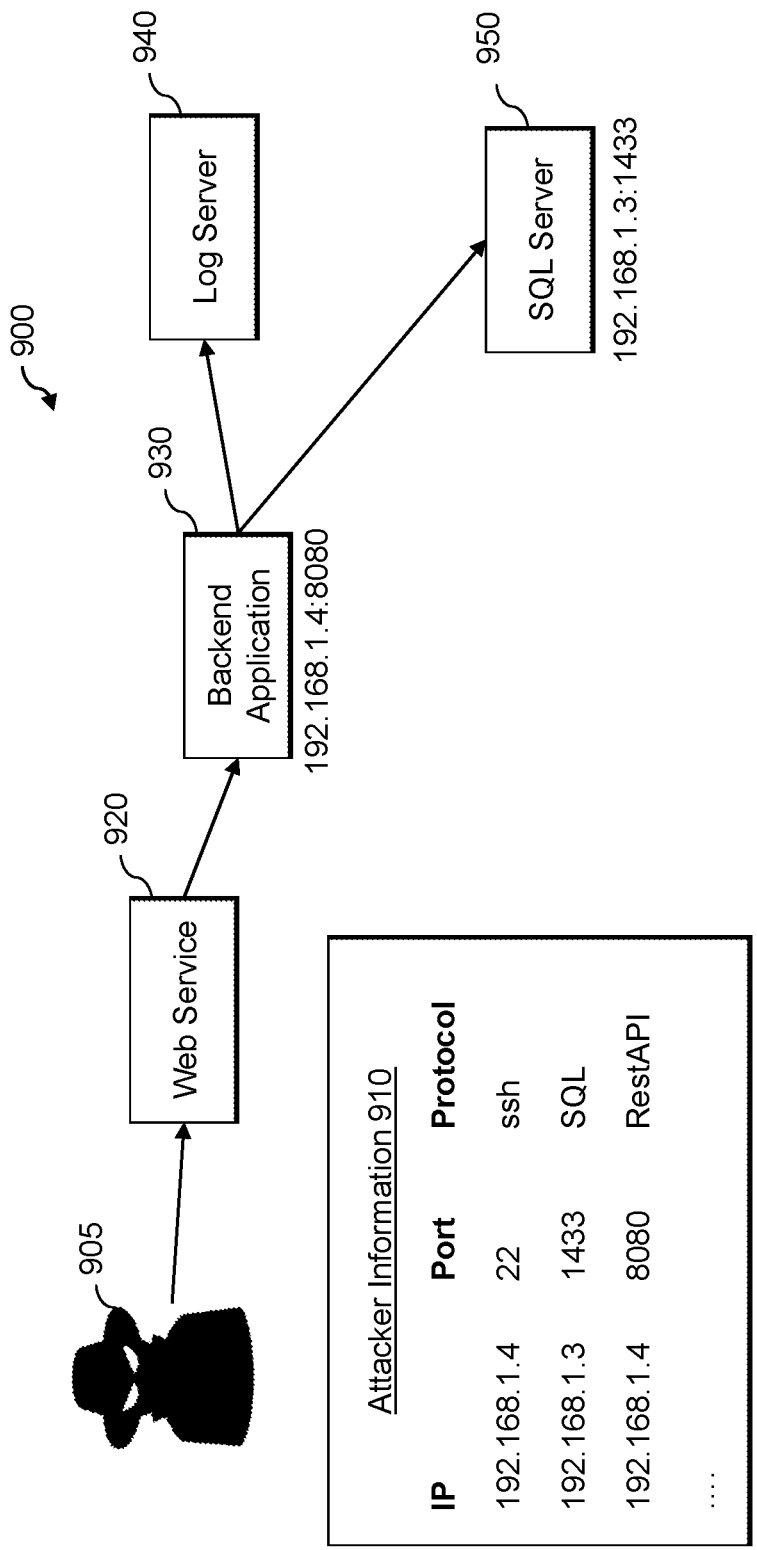
FIGS. 9 through 11 illustrate various stages in the life cycle of a stateful application, according to some embodiments of the disclosure.
Figure 10:
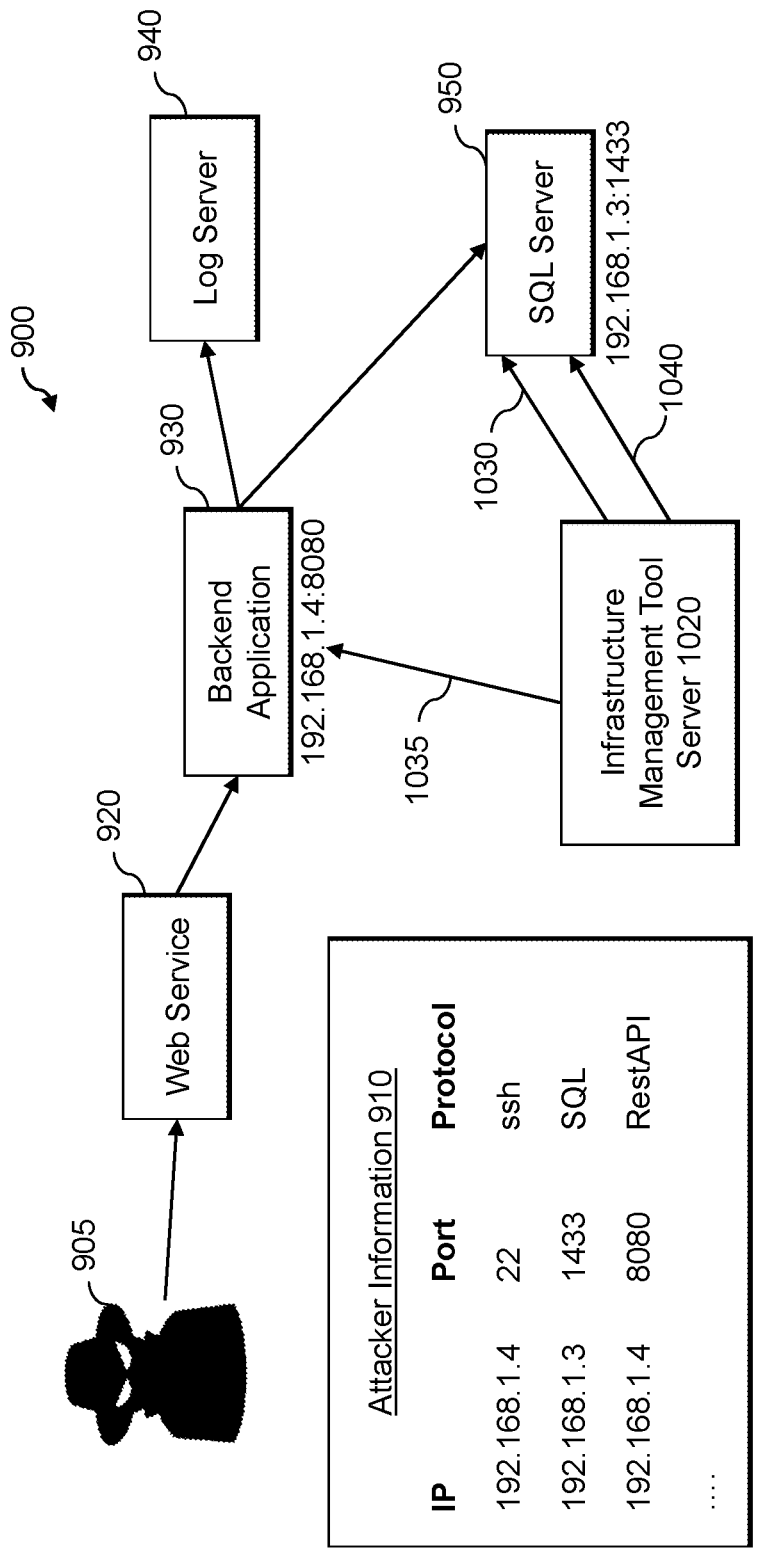
Figure 11:
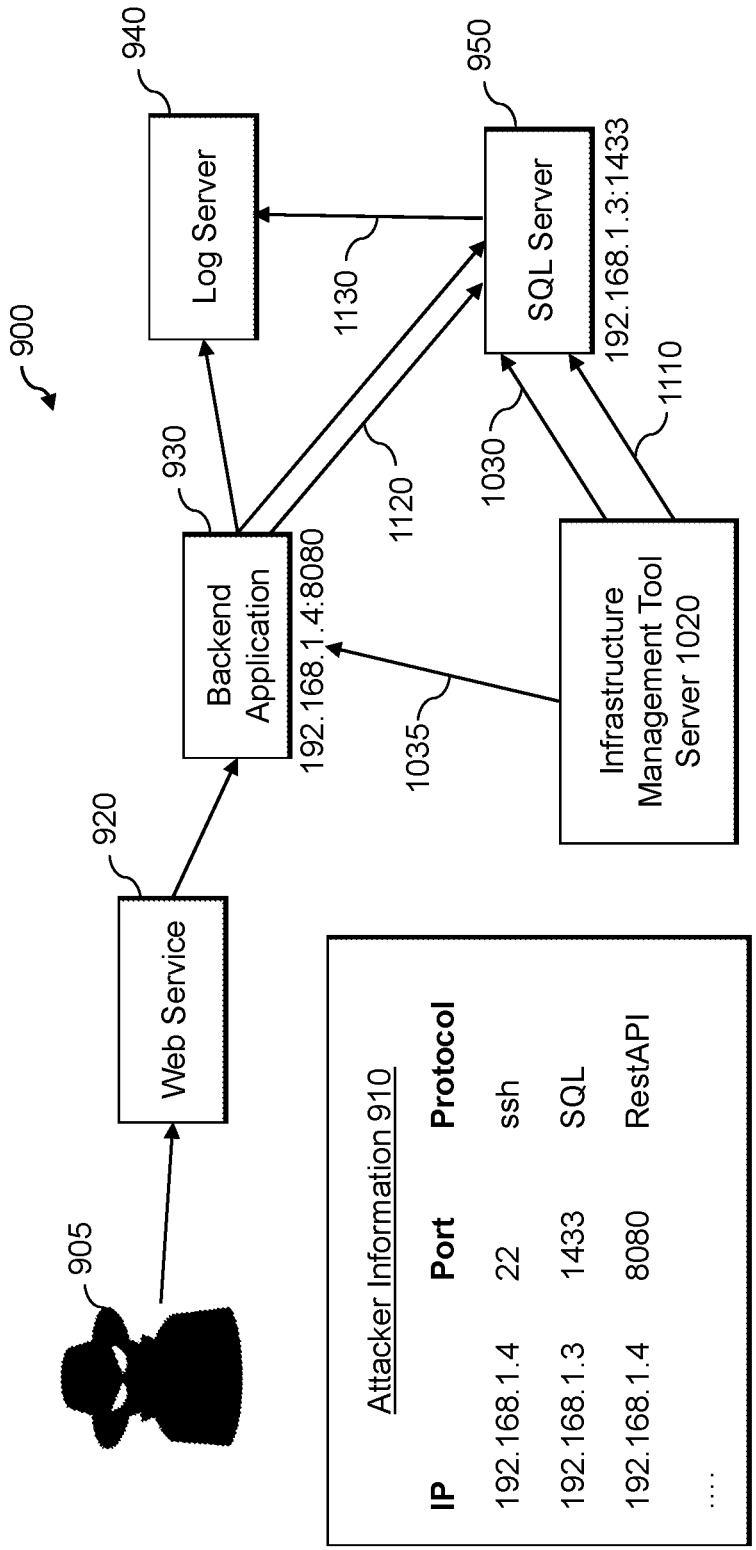

FIGS. 9 through 11 illustrate various stages in the life cycle of a stateful application, according to some embodiments of the disclosure. FIG. 9 illustrates an exemplary stateful application environment 900, according to some embodiments of the disclosure. As shown in FIG. 9, the exemplary stateful application environment 900 comprises a web service 920, a backend application 930, a log server 940 and a SQL server 950. Generally, a database web service 920 exposes a number of database functions, and the implementation of those functions gets executed on the backend by means of the backend application 930. The exemplary backend application 930 may serve multiple applications, in a known manner.

As noted above, in some embodiments, front-end (fe) application type containers 140-*fe* may be representative of server computing resources dedicated towards facilitating the interaction between a service and a user, or a service and another service. Likewise, in at least one embodiment, back-end (be) application type containers 140-*be* may be representative of server computing resources dedicated towards implementing the functional logic and operations supporting a service.

One or more aspects of the present disclosure recognize that pet servers, such as SQL server 950, are often critical for an enterprise organization and pet servers can often be easily mapped by an attacker, such as attacker 905, because their address or ports are static and do not change often. The disclosed MTD strategies are implemented by changing a network resource map using the disclosed network level MTD change techniques without interfering with organizational processes or shutting down any services.

In the example of FIG. 9, the attacker has acquired attacker information 910 during a reconnaissance phase indicating that the backend application 930 is assigned an IP address and port of 192.168.1.3:8080 and SQL server 950 is assigned an IP address and port of 192.168.1.4:1433.

FIG. 10 illustrates the exemplary stateful application environment 900 of FIG. 9, during a network level MTD change (e.g., a port assignment change of the exemplary SQL server 950), according to an embodiment of the disclosure. In the example of FIG. 10, the port assignment of port 1433 for the SQL server 950 is no longer relevant, as the port assignment is being changed from an exemplary port assignment of port 1433 to an exemplary port assignment of port 1435. In addition, in the example of FIG. 10, like-numbered elements that appear in both FIGS. 9 and 10 implement substantially similar functionality.

As shown in FIG. 10, in one exemplary embodiment, the disclosed network level MTD changes are implemented using an exemplary infrastructure management tool 1020, such as the Puppet™ tool, referenced above.

Generally, the SQL server 950 internally listen to a fixed port (or a fixed network address) that is not exposed externally and a routing table exposes port 1433 (or a network address) that are forwarded to the internal fixed port (or an internal fixed network address). During step 1030, the exemplary infrastructure management tool 1020 notifies the SQL server 950 to update the routing table to expose the new port (port 1435) (or network address).

Thereafter, during step 1035, the exemplary infrastructure management tool 1020 notifies the backend application 930 to update the service port for the SQL server 950 to port 1435 (for example, using an outgoing rule). It is again noted that the backend application 930 receives requests from a front-end application and processes the requests. In order to process the received requests, the backend application 930 inserts and/or obtains information from the SQL server 950. During the update of the backend application 930 by the infrastructure management tool 1020, old connections are been closed and new connections are opened to the new port (or address) of the SQL server 950. After the update is finished by the infrastructure management tool 1020, the connections from the backend applications 930 that target the SQL server 950 are opened to the new port (or address)

During step 1040, the exemplary infrastructure management tool 1020 notifies the SQL server 950 to block port 1433 (e.g., unlisten).

FIG. 11 illustrates the exemplary stateful application environment 900 of FIG. 9, during a network level MTD change (e.g., a port assignment change of the exemplary SQL server 950) when a honeypot listener is employed, according to at least one embodiment of the disclosure. In the example of FIG. 11, the port assignment of port 1433 for the SQL server 950 is no longer relevant, as the port assignment is being changed from an exemplary port assignment of port 1433 to an exemplary port assignment of port 1435 (in a similar manner as FIG. 10). In addition, in the example of FIG. 11, like-numbered elements that appear in both FIGS. 9 through 11 implement substantially similar functionality.

As shown in FIG. 11, in one exemplary embodiment, during step 1110 (rather than step 1040), the exemplary infrastructure management tool 1020 notifies the SQL server 950 to set the honeypot to listen to port 1433. Thereafter, assume that during step 1120, the exemplary attacker 905 attempts to send a malformed payload to the SQL server 950 via port 1433 (now outdated). Thus, the SQL server 950 will send a critical alert to the log server 940 during step 1130.

While the embodiments of FIGS. 9 through 11 are illustrated in the context of front-end application type containers 140-*fe* representing server computing resources dedicated towards facilitating the interaction between a service (e.g., database web service 920) and a user (or another service) and back-end application type containers 140-*be* supporting backend application(s) 930, the disclosed network level MTD change techniques can also be deployed as a service and balanced by a load balancer (e.g., load balancer 420 of FIGS. 4 through 6). In this common case, the application instance network address is not static but the other applications approach the service via the load balancer 420 (or another intermediary node) with a constant address. In such an embodiment, the load balancer 420 is updated with a new port or address using the disclosed network level MTD change techniques (e.g., the load balancer 420 is treated as the SQL server 950 in the examples of FIGS. 9-11 to protect the load balancer 420, and the applications are updated with the new port/address information for the load balancer 420).

CONCLUSION

One or more embodiments of the disclosure provide methods and apparatus for managing network level MTD changes for stateful applications. In one or more embodiments, techniques are provided for implementing MTD computer security techniques using network level changes for stateful applications that do not require downtime of the applications.

In some embodiments, the disclosed MTD strategies are implemented in a network layer for stateful applications and container-based and non-containerized applications without having to restart the applications.

The foregoing applications and associated embodiments should be considered as illustrative only, and numerous other embodiments can be configured using the techniques disclosed herein, in a wide variety of different applications.

It should also be understood that the disclosed techniques for network level MTD changes for stateful applications, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for network level MTD changes may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a container life cycle management system 100, or portions thereof, are illustratively implemented for use by tenants of such a multi-tenant environment.

Cloud infrastructure as disclosed herein can include cloud-based systems such as Amazon Web Services (AWS), Google Cloud Platfoi (GCP) and Microsoft Azure. Virtual machines provided in such systems can be used to implement at least portions of a network level MTD changes platform in illustrative embodiments. The cloud-based systems can include object stores such as Amazon S3, GCP Cloud Storage, and Microsoft Azure Blob Storage.

As noted above, the container registry 210 may be implemented, at least in part, using the Docker hub container registry, from Docker, Inc.; and in one or more embodiments, the Kubernetes Container Orchestration Engine (COE) (see, e.g., https://kubernetes.io/) may be employed to automate deployment, scaling, and management of the containerized applications.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the network level MTD change devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. These platforms may also be used to implement at least portions of other information processing systems in other embodiments.

Figure 12:
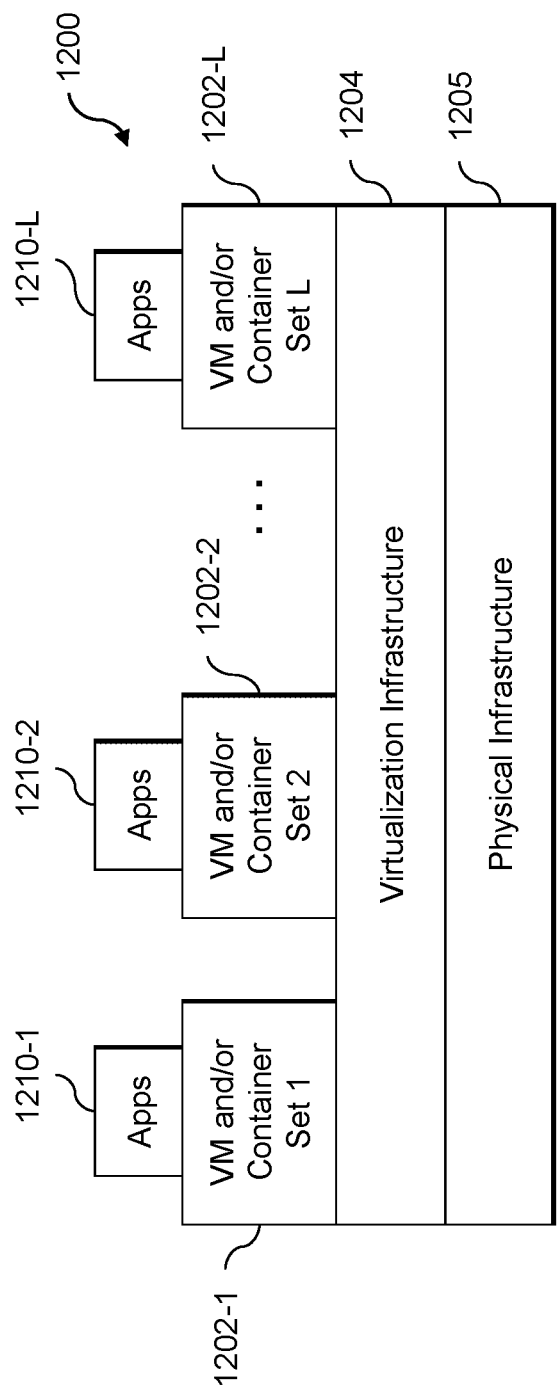
FIG. 12 illustrates an exemplary processing platform that may be used to implement at least a portion of one or more embodiments of the disclosure comprising a cloud infrastructure.

FIG. 12 shows an example processing platform comprising cloud infrastructure 1200. The cloud infrastructure 1200 comprises a combination of physical and virtual processing resources that may be utilized to implement at least a portion of the container life cycle management system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. Such implementations can provide network level MTD changes functionality for stateful applications of the type described above for one or more processes running on a given one of the VMs. For example, each of the VMs can implement network level MTD change control logic for one or more processes running on that particular VM.

An example of a hypervisor platform that may be used to implement a hypervisor within the virtualization infrastructure 1204 is the VMware® vSphere® which may have an associated virtual infrastructure management system such as the VMware® vCenter™. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system. Such implementations can provide network level MTD change functionality of the type described above for one or more processes running on different ones of the containers. For example, a container host device supporting multiple containers of one or more container sets can implement one or more instances of network level MTD change control logic and associated routing tables for use in making network level MTD changes for stateful applications.

As is apparent from the above, one or more of the processing modules or other components of container life cycle management system 100 may each run on a computer, server, storage device or other processing platform element.

A given such element may be viewed as an example of what is more generally referred to herein as a "processing device." The cloud infrastructure 1200 shown in FIG. 12 may represent at least a portion of one processing platform.

Figure 13:
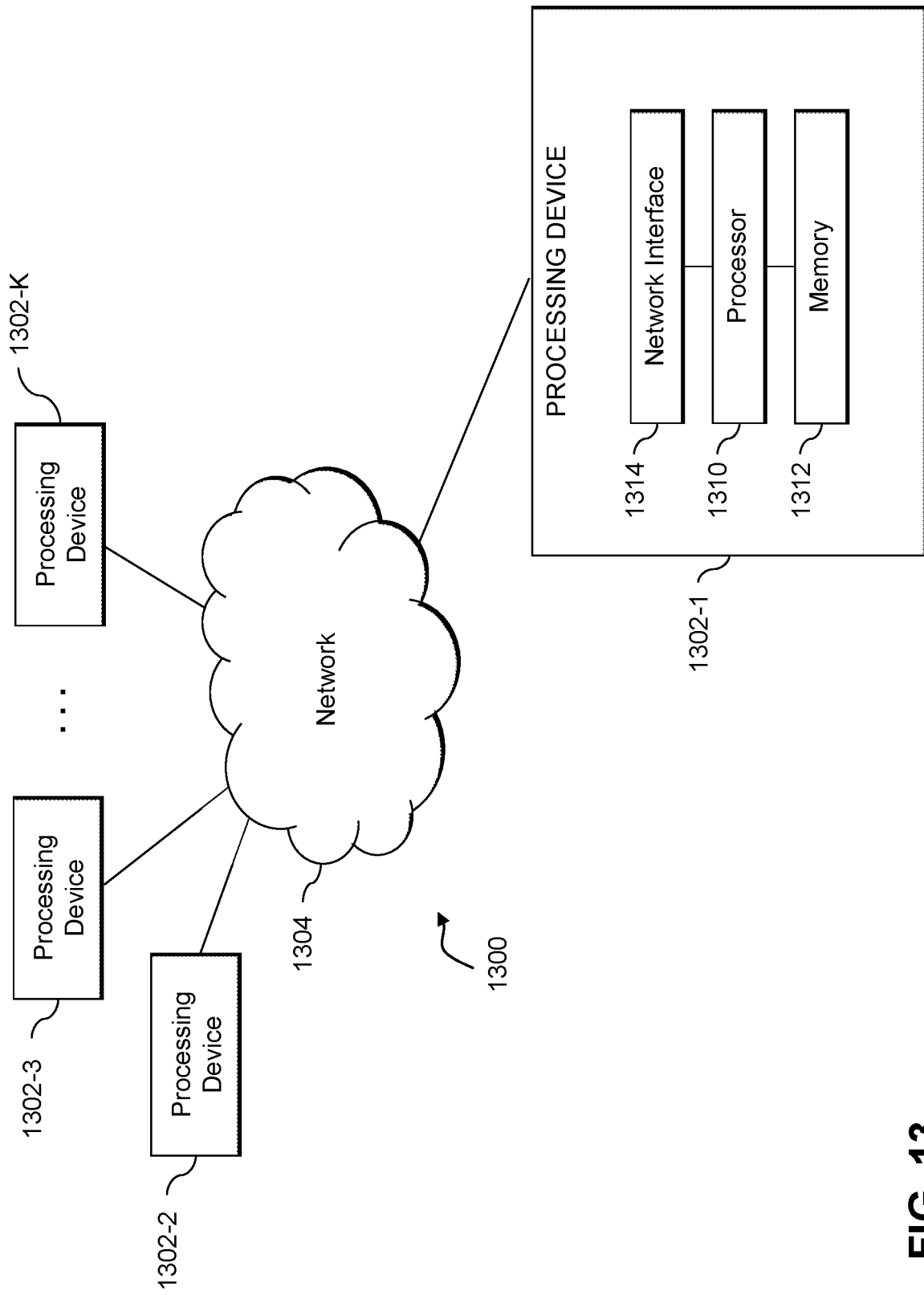
FIG. 13 illustrates another exemplary processing platform that may be used to implement at least a portion of one or more embodiments of the disclosure.

Another example of a processing platform is processing platform 1300 shown in FIG. 13. The processing platform 1300 in this embodiment comprises at least a portion of the given system and includes a plurality of processing devices, denoted 1302-1, 1302-2, 1302-3, . . . 1302-K, which communicate with one another over a network 1304. The network 1304 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1302-1 in the processing platform 1300 comprises a processor 1310 coupled to a memory 1312. The processor 1310 may comprise a microprocessor, a microcontroller, an application specific integrated circuit (ASIC), a field programmable gate array (FPGA) or other type of processing circuitry, as well as portions or combinations of such circuitry elements, and the memory 1312, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and the given system may include additional or alternative processing platforms, as well as numerous distinct processing platforms in any combination, with each such platform comprising one or more computers, storage devices or other processing devices.

Multiple elements of container life cycle management system 100 or portions thereof may be collectively implemented on a common processing platform of the types shown in FIGS. 12 and 13, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of the flow charts and/or pseudo code shown in FIGS. 3, 7 and 8 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and compute services platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
identifying a first application listening to one or more of a first port and a first network address;
notifying, using at least one processing device, the first application to listen to one or more of a second port and a second network address;
notifying, using the at least one processing device, at least one additional application that the first application is listening to one or more of the second port and the second network address; and
notifying, using the at least one processing device, the first application to unlisten to one or more of the first port and the first network address, wherein the first application operates in a substantially continuous manner during a change from listening to one or more of the first port and the first network address and listening to one or more of the second port and the second network address, wherein the first application listens to one or more of an internal fixed port and an internal fixed network address and wherein a routing table exposes one or more of the first port and the first network address that are forwarded to one or more of the internal fixed port and the internal fixed network address until the first application is notified to listen to one or more of the second port and the second network address.

2. The method of claim 1, wherein the first application is a stateful application having persistent storage.

3. The method of claim 1, wherein the step of notifying the first application to listen to one or more of the second port and the second network address is performed using an incoming rule in a routing table employed by the first application.

4. The method of claim 1, wherein the step of notifying the at least one additional application that the first application is listening to one or more of the second port and the second network address is performed by an infrastructure management tool.

5. The method of claim 1, further comprising the step of routing communications for one or more of the first port and the first network address, following the notifying the first application to listen to one or more of the second port and the second network address, to a honeypot listener to generate one or more alerts based on one or more of a predefined policy and a predefined rule.

6. The method of claim 1, wherein the unlistening to one or more of the first port and the first network address by the first application comprises updating the routing table to expose one or more of the second port and the second network address that are forwarded to one or more of the internal fixed port and the internal fixed network address.

7. The method of claim 1, further comprising the step of restarting the at least one additional application to load the at least one additional application with a new configuration to communicate with the first application at one or more of the second port and the second network address.

8. A system, comprising:
a memory; and
at least one processing device, coupled to the memory, operative to implement the following steps:
identifying a first application listening to one or more of a first port and a first network address;
notifying the first application to listen to one or more of a second port and a second network address;
notifying at least one additional application that the first application is listening to one or more of the second port and the second network address; and
notifying the first application to unlisten to one or more of the first port and the first network address, wherein the first application operates in a substantially continuous manner during a change from listening to one or more of the first port and the first network address and listening to one or more of the second port and the second network address, wherein the first application listens to one or more of an internal fixed port and an internal fixed network address and wherein a routing table exposes one or more of the first port and the first network address that are forwarded to one or more of the internal fixed port and the internal fixed network address until the first application is notified to listen to one or more of the second port and the second network address.

9. The system of claim 8, wherein the first application is a stateful application having persistent storage.

10. The system of claim 8, wherein the step of notifying the first application to listen to one or more of the second port and the second network address is performed using an incoming rule in a routing table employed by the first application.

11. The system of claim 8, wherein the step of notifying the at least one additional application that the first application is listening to one or more of the second port and the second network address is performed by an infrastructure management tool.

12. The system of claim 8, further comprising the step of routing communications for one or more of the first port and the first network address, following the notifying the first application to listen to one or more of the second port and the second network address, to a honeypot listener to generate one or more alerts based on one or more of a predefined policy and a predefined rule.

13. The system of claim 8, wherein the unlistening to one or more of the first port and the first network address by the first application comprises updating the routing table to expose one or more of the second port and the second network address that are forwarded to one or more of the internal fixed port and the internal fixed network address.

14. The system of claim 8, further comprising the step of restarting the at least one additional application to load the at least one additional application with a new configuration to communicate with the first application at one or more of the second port and the second network address.

15. A computer program product, comprising a non-transitory machine-readable storage medium having encoded therein executable code of one or more software programs, wherein the one or more software programs when executed by at least one processing device perform the following steps:
identifying a first application listening to one or more of a first port and a first network address;
notifying the first application to listen to one or more of a second port and a second network address;
notifying at least one additional application that the first application is listening to one or more of the second port and the second network address; and
notifying the first application to unlisten to one or more of the first port and the first network address, wherein the first application operates in a substantially continuous manner during a change from listening to one or more of the first port and the first network address and listening to one or more of the second port and the second network address, wherein the first application listens to one or more of an internal fixed port and an internal fixed network address and wherein a routing table exposes one or more of the first port and the first network address that are forwarded to one or more of the internal fixed port and the internal fixed network address until the first application is notified to listen to one or more of the second port and the second network address.

16. The computer program product of claim 15, wherein the first application is a stateful application having persistent storage.

17. The computer program product of claim 15, further comprising the step of routing communications for one or more of the first port and the first network address, following the notifying the first application to listen to one or more of the second port and the second network address, to a honeypot listener to generate one or more alerts based on one or more of a predefined policy and a predefined rule.

18. The computer program product of claim 15, wherein the unlistening to one or more of the first port and the first network address by the first application comprises updating the routing table to expose one or more of the second port and the second network address that are forwarded to one or more of the internal fixed port and the internal fixed network address.

19. The computer program product of claim 15, further comprising the step of restarting the at least one additional application to load the at least one additional application with a new configuration to communicate with the first application at one or more of the second port and the second network address.

20. The computer program product of claim 15, wherein the step of notifying the at least one additional application that the first application is listening to one or more of the second port and the second network address is performed by an infrastructure management tool.

\* \* \* \* \*